March 25, 1969    SHINZO KIYOHARA ET AL    3,434,905
METHOD OF MANUFACTURING LEAD DIOXIDE ELECTRODE
Original Filed Jan. 28, 1963
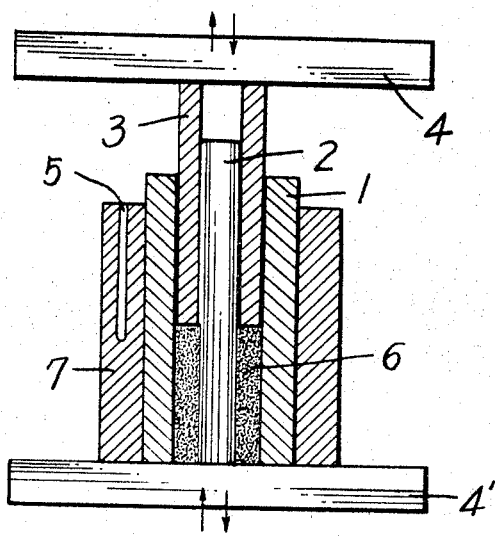
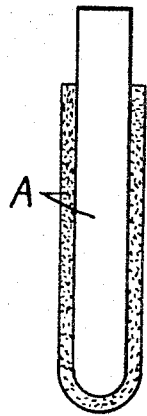
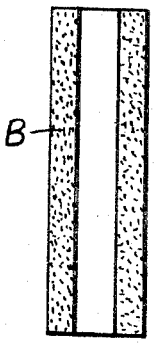
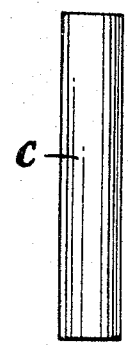

United States Patent Office 3,434,905
Patented Mar. 25, 1969

3,434,905
METHOD OF MANUFACTURING LEAD DIOXIDE ELECTRODE
Shinzo Kiyohara and Yasuichi Shibasaki, Yokohama, Japan, assignors to Isomura Sangyo Kaisha, Ltd., Tokyo, Japan, a corporation of Japan
Original application Jan. 28, 1963, Ser. No. 254,184, now Patent No. 3,318,794, dated May 9, 1967. Divided and this application Aug. 30, 1966, Ser. No. 590,450
Int. Cl. B01k 3/04, 3/06
U.S. Cl. 156—327                2 Claims

ABSTRACT OF THE DISCLOSURE

A process of manufacturing a unit electrode body by uniting two separate electrode bodies made of lead dioxide powder by employing converted lead dioxide as a binder at a temperature higher than 130° C. and at an elevated pressure to weld them together.

---

The present invention relates to a method of manufacturing various electrodes for the electrolysis of electrolytic solutions.

This application is a division of copending application Ser. No. 254,184, filed Jan. 28, 1963, now patent 3,318,794.

As an anode for oxidation electrolysis and having corrosion resistance, the inventors have suggested several production processes having comparatively thin layers of lead dioxide coating upon a pressure-hot-molded electrode body composed of powdered lead dioxide ($PbO_2$) in a press-mold, in which one or more kinds of thermoplastic resin or thermo-setting plastic resin and pretreated lead dioxide powder will be molded into an electrode under pressure at an elevated temperature.

For a better understanding of the invention reference is taken to the accompanying drawings, in which FIG. 1 is a diagrammatic view partially in section of the press-mold for manufacturing a lead dioxide electrode body embodying the invention; and FIGS. 2, 3 and 4 are sectional elevations respectively of three different types of the electrodes manufactured by the invention.

At first, the processes of manufacturing molded electrode body of the invention will be explained by referring to the drawings.

In FIGURE 1, 1 designates a pressure tight metal molding, case, 2 is a core of an electrode, 3 is a pushing rod, 4 is a hot plate of a press machine, 4' a bottom plate of the same, 5 a hole to insert a thermo-couple, 7 the outside steel mantle of the pressure mold casing. The pressure tight metal molding case 1 is set upon the hot plate 4' of the press machine and at the center of the case 1, a core electrode 2 is located firmly with uniform clearance 6 between 1 and 2. After placing a proper amount of lead dioxide powder mixed with an adequate amount of a thermo-plastic or thermo-setting resin in solvent into the space 6, a pushing rod 3 is inserted upon this mass space.

Electric heating wires distributed around 4' and 1, which are not shown in FIGURE 1, are connected to the electric source and the temperature is measured by a thermocouple inserted in 5. When the temperature is elevated to the desired degree, the upper hot plate 4 is movd down to touch the powder at 3, and by adjusting the handle of high pressure oil pump of hydraulic press to move upward the lower hot plate 4' at ram under 4' the powder is pressed into a solid electrode body.

The molded powder in 6 can be classified into the following three types in accordance with next step of treatment whether to take out the center core (rod), or an electrode with center rod as it is shown in FIGURES 2, 3, and 4, where, (i) FIGURE 2 shows a A-type electrode body which has a surrounding layer of corrosion resistant and electro-conductive lead dioxide mass on the center metal core.

(ii) FIGURE 3 shows a B-type electrode body having cylindrical layer, which is made only of solid corrosion resistant and electric conductive mass.

(iii) FIGURE 4 shows a C-type electrode body, which is made only of solid corrosion resistant and electric conductive materials without a center metal rod.

These three types of electrodes are referred to herein as "electrode body." This electrode body can be coated with a thin film of lead dioxide by an electrolysis using it as an anode in a lead salt solution. Thus, corrosion resistant and electrically conductive lead dioxide electrode can be produced, which is characterized by having high overvoltages for oxygen in anodic oxidation electrolysis of electrolytes.

The electrode body itself without any electrically deposited lead dioxide film can be used as a corrosion resistant electrode for the similar purposes, but this coating increases its mechanical strength as a corrosion resistant electrode.

A thus prepared electrode coated with a thin film of electrolytically deposited lead dioxide, will suffice in its characteristic function as a lead peroxide electrode which is well known by electro-chemical engineers, and also it serves as an oxidation anode for the electrolysis of salt solutions.

If there are any microscopic pin-holes in the layer of corrosion resistant lead dioxide molded by this process, however, which is settled by thermo-setting or thermoplastic resin, the electrolytic deposition of lead dioxide coating upon the electrode body is practically impossible because of the diffusion of electrolyte into the corrosion resistant layer. In case of the A-type electrode showin in the drawings having a central metal core, the electrolyte diffuses into the lead dioxide layer and shall cause etching of core metal and is not a faultless electrode.

It will also cause the failure of good adhesion of depositing lead dioxide film upon a corrosion resistant layer by electrolytic deposition of the lead dioxide coating.

Therefore, the main object of this invention is to provide a process for manufacturing a faultless, compact, and homogeneous, corrosion resistant electrode body on an industrial scale.

The following explanation will enable an understanding of the methods of production according to the invention.

If the corrosion resistant layer of an electrode body mollifies at elevated temperatures during the electrolytic deposition of lead dioxide upon the basic body in lead salt solution, the electrode will deform during this process or the electrolytically deposited layer will fall off, or will be damaged resulting in an imperfect electrode. When first deposited the electrolytically deposited layer of lead dioxide is hard and brittle and has little elasticity against thermal change, it is desirable to deposit electrically a lead dioxide layer upon the basic body at as high a temperature as possible in electrolysis, because the product should be used practically at elevated temperatures during the electrolysis of salt solutions in industrial services. For this reason, the electrode body must be resistant to thermal deformation at higher temperatures in lead salt solution even during the deposition electrolysis of the lead dioxide layer.

To fulfill this object, it is desirable to use lead dioxide powder to mold the basic electrode body which has the same physical property as the lead dioxide layer deposited upon it. The lead dioxide powder is non-plastic, therefore, it is difficult to produce the electrode body having an homogeneous thickness and compactness throughout the layer of powdered lead dioxide by a molding process in an industrial scale, but the invention affords an easy approach to this possibility.

Generally speaking, there are many methods of pressure molding of powdered materials, such as a compression process, casting process, hydraulic settling process, injection molding process, etc. Among them, casting, settling, and injection molding processes are not suitable for these purposes because of the formation of bubbles or blow holes caused by mixed liquid or gas in powdered materials, hence, by these processes, a non-adhesive and non-corrosion resistant electrode body can only be obtained when electrolytically a lead dioxide layer is electrolytically deposited (especially in the case of an A-type electrode). The pressure molding process might be the best in this case to get an homogeneous and compact electrode body without pin-holes.

When a A-type electrode or B-type electrode body is prepared by a pressure molding process, powdered lead dioxide will be put into the space 6 between the outside metal molding case and the central metal rod, or in the case of a C-type electrode, the powder will be filled in the space of the molding case under the pushing rod 3, and the pressure will be given to the powder from 3 by a squeezing movement of the hydraulic press hot plates 4 and 4' in FIGURE 1.

In this case, the pressure is given always in a single direction, the friction between the particles of lead dioxide, or friction between powder and central metal core, will cause a heterogeneous distribution of the compressing force in space 6. In some cases, for instance, some portion of the powder layer will make relatively quickly a compressed layer almost normally to the direction of compression and the powder above this layer will receive the main compressive force, while the lower layer will receive less compression, thus an heterogeneously layered electrode body will be obtained. Such electrode body will give a bad coating of electrolytically deposited lead dioxide layer in electrolysis later.

The inventors have concentrated their efforts to obtain a process for molding a compact and homogeneous electrode body and have finally attained the object by using such adhesives for lead powder as thermo-plastic or thermo-setting synthetic resins mixed proportionally with lead dioxide powder before the hot pressure molding process is applied. Available synthetic resins might be: Methacryl resin, polyvinyl chloride, styrene, polystyrene, polyethylene, polycarbonates, copolymer of acrylonitrile and stylrene, etc. as thermo-plastic resins: urea resin phenol resin, polyester resin melamine resin, epoxy resin, etc. as thermo-setting resins.

Hereinafter the lead dioxide powder treated with such plastic resins will briefly be called as "converted lead dioxide powder" or be further abridged to "converted powder."

Though lead dioxide is hydrophilic by nature, and these resins are generally hydrophobic, therefore, the converted powder is not hygroscopic. Thus, there is no possibility of causing bubbles of water or gas inside the pressing layer. The temperature of the molding process is effectively chosen at such temperature that the mixed plastic resin will soften in case of a thermo-plastic resin, while, in case of a thermo-setting resin, the temperature should be kept lower than its setting temperature during the formation of the electrode. After this process, the temperature is raised to set it, but the temperature is not so high as to cause the decomposition of lead dioxide powder. By this temperature, a very homogeneous and a very compact electrode body can be made with hot press molding. Further, this converted powder has another advantage in fabrication for the molding process, as the powder will become slightly plastic by heating and the resistance between powder particles, friction between powder mass and inside surface of molding case, and friction between mass and central metal core, will be greatly reduced. The pressure distribution from the pressing rod 3 will be distributed homogeneously in the powder mass, thus contributing to good results by producing a compact and homogeneous electrode body, while with powder without plastic resin it is not possible to get such results. Even if some part of powder mass where rather heterogeneously compressed and a first stage of compression might exist, homogeneity of compression can only be achieved if the pressure and temperature of hot press is reasonably raised. This process guarantees the production of compact, homogeneous, and hard electrode bodies by the addition of these plastic resins in small amounts to a lead dioxide powder. The thermo-plastic resins or thermo-setting resins whose softening or setting temperature is reasonably lower than the decomposition temperature of lead dioxide are used, the pressure distribution inside the converted powder will be different, i.e. the converted powder with resin having higher softening temperature will cause more solubility of powder into resin than the powder without resin, and some organic solvent having a low boiling point will be available to make the powder mass wet, which will cause another favourable effect of gelatinization of the resin adhering the lead dioxide particles and this will also contribute the effect of lubrication in the pressing process.

The converted powder can be put in the space between molding case and central metal rod in the case of A-type or B-type electrodes, while in case of C-type electrodes, the powder can be put simply into the molding case without a central core. Pushing rod 3 can be applied to squeeze out the excess organic solvent from the powder mass and can set a preliminary form of electrode. Then, the temperature of the molding case and the hot-plates will gradually be raised to evaporate the remaining organic solvent and the powder mass can be compressed slowly. The particles of lead dioxide will then be set together by thermo-plastic or thermo-setting resin to form a solid and compact electrode body.

If such plastic resins having relatively low softening or setting temperature are used, the converted powder will be set by heating and the plasticity of the powder itself will enable the obtention of a homogeneous pressure distribution in every direction in the molding case at elevated temperatures and pressures. On the other hand, if some plastic resin having a higher softening point but mixed with some organic solvent having low boiling temperature, is employed the gelatinization of resin itself around the powder will serve to distribute the compressive force homogeneously in the powder mass. As stated in the foregoing, the characteristic feature of the invention lies in the use of thermo-plastic or thermo-setting resins having a softening or setting temperature lower than the decomposition temperature of lead dioxide powder. The resin itself or solution of resin in organic solvents, will be put in the powder and is mixed with the powder through appropriate treatment mentioned later and will be filled in the molding case to give desired form, and such form as plate, or rod, or hollow cylinder, or center metal cored electrode, by pressing in the molding case with elevated temperatures by electric heating devices to give the powder some plasticity, or to gelatinize the resin during the compressing process and thus make it possible to obtain a highly homogeneous, compact and hard electrode body. However, the stroke length of molding case is limited to some extent and it is possible to connect the aforementioned unit pieces of molded electrode body with appropriate organic adhesives or connect them to each other by elevated temperature and pressure just like welding to make a long rod or cylinder useful for industrial purposes of electrolysis.

By this method, the production cost of the electrode body will be reduced requiring a smaller investment in the pressing machine. Normally some copper terminals will be necessary to give electric current to the electrode body and the terminal is usually connected to the electrode at the outside of electrolytic cell for salt solution. It was recognized in experiments that an enormous resistance existed at this connecting surface of copper terminal directly contacting with the surface of lead dioxide layer of molded electrode body and hence, undesired heating will occur at this point, causing undesirable effects of elevated temperature in the electrolytic cell. Therefore, it is advisable to galvanize silver or insert a thin silver film at this connecting surface under a copper terminal, especially is it necessary to do so for C-type electrode. The electrode body having a central rod made of stainless steel or nickel tube or rod, on which the converted powder was compressed tightly, as shown in FIGURE 2, there, the bare metal part above lead dioxide layer can conveniently be used to connect the copper terminal without any difficult. Other practical forms of the electrode body such as the B-type, the galvanization of the inside surface of the electrode body is necessary. At first, silver shall be deposited on its inner surface and then a copper layer shall be deposited upon it, thus giving a uniform and sufficient surface area to distribute the current in the electrode throughout the copper terminal.

One of the inventors Mr. Yasuichi Shibasaki experimented on anodic oxidation of sulfuric acid acidified ammonia sulfate solution using cylindrical platinum electrode which was internally cooled with water and the results were made public in "Denki Kagaku Zasshi" (Bulletin of Electro-Chemical Society of Japan, vol. 24 (1956) p. 225). By cooling the anode directly, he found that the surrounding solution of anode could effectively be kept at a lower temperature and obtain a remarkable increase in current efficiency of electrolysis for the preparation of the per-sulfate ion ($S_2O_8^{--}$).

Therefore, the cooling of the anode for anodic oxidation of salt solutions will give an effective increase in the anodic current efficiency and a B-type electrode body can be effectively used for such purpose. The compactness and homogeneity of the prepared electrode body pursuant to the above-mentioned process of hot molded converted powder, can be checked by measuring the electrode resistance of the electrode body.

The invention will be described in detail by the following examples:

Example 1

As the solvent of thermo-plastic resin, a mixture of acetone, chloroform, and acetone with benzene was used. Hereafter the process will be explained in detail by using acetone only or a mixture of acetone with benzene as the solvent of a copolymer of acrylonitrile and styrene resin (melting point 110° C.), to set the converted lead dioxide powder in to a press mold process.

(1) 9 g. of a copolymer of acrylonitrile and styrene obtained commercially were dissolved in 70 cc. of acetone to which 300 g. of 100 mesh lead dioxide powder was added and stirred thoroughly. The paste mass was spread upon a glass plate and left in open air for about 15 minutes to evaporate the excess solvent. The dry mass was powdered again into 100 mesh powder and it was kept in a hot air-bath at 60° C. for two hours to finally dry. The resulting powder is the so-called converted powder containing 3 percent of resin in the lead dioxide powder.

(2) A mixture of 60 cc. acetone and 40 cc. benzene was used to dissolve 30 g. of acrylonitrile-styrene copolymer obtained in market. 600 g. of 100 mesh powder of lead dioxide was mixed with this solution and stirred thoroughly. This paste was spread on a glass panel in thin film dried in open air for about 20 hours. The almost odourless film was powdered again into 100 mesh and was kept in 80° C. hot air-bath for three hours. Thus 5 percent of resin was present in the converted powder.

These two processes give converted lead dioxide powder with plastic resin to be used in a hot molding press machine. The resin will be softened under this hot-press but lead dioxide will not be decomposed when the temperature is kept in the range of 130 to 180° C.

Example 2

A wrought steel pressure molding case that is divided into two parts and having the size of 150 mm. in height, inside diameter of molding space 16 mm., upper outside diameter 40 mm., lower outside diameter 37 mm., was set in another outside mantle made of wrought steel having the dimensions of 145 mm. in height, outside diameter 90 mm., inside diameter 40–37 mm. with an equally tapered hole. Insulated Nichrome wire with porcelain cylinder tips was wound around the outside of this mantle. The electric current was adjusted to get the best temperature for the molding case by a controlled transformer.

This assembly was then put between two hot plates of a hydraulic press machine, and these two plates also were equipped with an electric heating device to give the desired temperature to the converted powder inside the molding case. A stainless steel rod having a size of 8 mm. in diameter and 200 mm. of length was placed exactly at the center of the molding case. The clearance between the rod and molding case was kept uniformly at 4 mm. After putting 180 g. of converted powder into this space and putting the pushing rod having the size of 100 mm. in length, inside diameter of 8.1 mm., outside diameter of 15.8 mm. on the surface of the powder mass in the molding case, preparations for the hot pressing were ready to start. When the temperature of the hot plates and that of molding case arrived at the deired value, the hydraulic press squeezed the powder between the two hot plates. For instance, when a thermo-couple is inserted in a hole 6 x 50 mm. at the center of the molding case wall indicated at 130° C., the upper hot plate is gradually moved down to push the powder by pushing rod and by handling the lever of valve for the hydraulic press, the lower hot plate is moved upward to press the powder tightly in the molding case. Then the pressure gauge of the hydraulic press reaches the pre-determined value. The time interval elapsed until the clearance between the top edge of outside mantle of molding case and the lower surface of upper hot plate, reaches at a pre-determined value, or becomes constant, is conventionally called the time of compression and the pressure then prevailing is called as "compression pressure."

The technical data of an electrode body thus prepared, made of 3 percent and 5 percent resin converted powder are tabulated as follows:

(1) 3% RESIN CONVERTED POWDER

| Number of experiments | 1 | 2 |
|---|---|---|
| Heating temperature in ° C | 135–148 | 140–155 |
| Compression pressure in kg./cm.² | 800 | 1,035 |
| Time of compression in minutes | 30 | 45 |
| Molded electrode: | | |
| Length in mm | 105 | 98 |
| Thickness in mm | 4 | 4 |
| Appearance | (¹) | (²) |
| Electric resistance in ohm/cm | 8.5±0.3 | 6.7±0.1 |

¹ Rough and mat.
² Smooth with luster.

(2) 5% RESIN CONVERTED POWDER

| Number of experiments | 1 | 2 |
|---|---|---|
| Heating temperature in ° C | 160–175 | 163–178 |
| Compression pressure in kg./cm.² | 1,190 | 1,590 |
| Time of compression in minutes | 30 | 45 |
| Molded electrode: | | |
| Length in mm | 95 | 90 |
| Thickness in mm | 4 | 4 |
| Appearance | (¹) | (¹) |
| Electric resistance in ohm/cm | 6.3±0.3 | 5.8±0.2 |

¹ Black with luster.

Example 3

Instead of pushing rod in Example 2, a solid steel rod of 15.8 mm. in diameter and 100 mm. in length was used. C-type electrode body was prepared with 3% resin converted powder 350 g. with similar treatment unless otherwise mentioned than Example 2.

Heating temperature in ° C. _____ 145–153
Compression pressure in kg./cm.$^2$ _____ 2380
Time of compression in minute _____ 60
Solid electrode:
    Length in mm. _____ 85
    Diameter in mm. _____ 16
    Appearance, black with luster.
    Electric resistance in ohm/cm. _____ 5.2±0.1

Example 4

A block of wrought steel having the size of 150 mm. in height, upper outside diameter 40 mm., lower outside diameter 37 mm., was cut into equally portioned two pieces along the vertical center line and giving a vertical groove of 15 x 2.5 mm. (breadth×depth) along the cutting line in symmetrical position to get a molding case for a C-type plate electrode. These two cases were set tightly in an outside pressure tight mantle as in Example 2. The pushing rod having a size of 14.8 mm. in breadth, 4.8 mm. in depth, 100 mm. in length and made of wrought steel was inserted into the molding case containing 3% converted powder in a manner similar to that described in Example 2 and pressed to make a C-type electrode body.

Heating temperature in ° C. _____ 147–150
Compression pressure in kg./cm.$^2$ _____ 1820
Time of compression in minute _____ 40
Molded plate electrode:
    Length in mm. _____ 93
    Breadth in mm. _____ 15
    Thickness in mm. _____ 5
    Appearance, smooth surface with black luster.
    Electric resistance in ohm/cm. _____ 5.6±0.2

Example 5

500 g. of 80 mesh powder were mixed while stirring with 10 g. of polycarbonate solution (melting point 222–230° C.) with methyl chloride 75 cc. (JIS Class I Reagent), mixed thoroughly and settled for about 30 minutes. After standing, the mass was again powdered into 80 mesh and thus there was prepared 2% resin converted powder. By using a center core rod of stainless steel having the dimension of 8 mm. x 200 mm., and the same arrangement as described in Example 2, an A-type electrode body was produced.

180 g. of a 2% resin converted powder 180 g. were mixed with 10 cc. of methyl chloride, and quickly put into the space between the center rod and molding case. After setting the pushing rod, pressure was maintained at 100–159 kg./cm.$^2$ for about 60 minutes. The pushing rod was then taken out of the molding case. Heating current was applied to the hot plates and to the molding case, and the pushing rod was prepared to press down again on the powder mass by the next step. When the temperature of the thermo-couple indicated 50° C., the upper hot plate was going down to the pushing rod and the lower hot plate was moved upward slowly by the manual control of the valve lever of the hydraulic press and compressing the powder in molding case. When the clearance between the lower edge of upper hot plate and the upper edge of outside mantle of molding case became constant, the pressure was released and molded electrode body was taken out of the case after cooling.

Heating temperature in ° C. _____ 50–55
Compression pressure in kg./cm.$^2$ _____ 2250
Time of compression in minute _____ 85
Molded electrode:
    Length in mm. _____ 83
    Thickness in mm. _____ 4
    Appearance, smooth with black luster.
    Electric resistance in ohm/cm. _____ 4.5±0.1

Example 6

Using the same molding case as stated in Example 3 and using a polycarbonate converted powder (2%), C-type electrode body under same process as described in Example 5 was prepared.

Amount of lead dioxide powder in g. _____ 300
Amount of methyl chloride in cc. _____ 20
Heating temperature in ° C. _____ 57–60
Compression pressure in kg./cm.$^2$ _____ 1950
Time of compression in minute _____ 90
Solid electrode:
    Length in mm. _____ 87
    Diameter in mm. _____ 16
    Appearance, smooth surface with luster.
    Electric resistance in ohm/cm. _____ 5.0±0.3

Example 7

7.5 g. of Bakelite-A powder purchased in the market was dissolved in 30 cc. of methyl alcohol and there was added to it 250 g. of 30 mesh lead dioxide powder and mixed thoroughly. This mixture was spread on a glass panel and methyl alcohol was evaporated into open air for 2 hours. The obtained converted powder containing 3% resin was molded into an A-type electrode body by using 180 g. of converted powder in a molding case with a pushing rod made of stainless steel having the dimensions of 8 mm. in diameter and 200 mm. in length. The molded electrode had the size of 16 mm. in diameter, 100 mm. in length, molded in a similar process as in Example 2. Molding conditions and the results are tabulated as follows:

Heating temperature in ° C. _____ 165–170
Compression pressure in kg./cm.$^2$ _____ 2100
Time of compression in minute _____ 60
Layer of molded lead dioxide:
    Length in mm. _____ 100
    Thickness in mm. _____ 4
    Appearance, rather rough surface, red brown.
    Electric resistance in ohm/cm. _____ 6.5±0.3

Example 8

Hard chrome galvanized molding case having the dimensions of 20 mm. in height, inside diameter 50 mm., upper outside diameter 90 mm., lower outside diameter 87 mm., was put into the outside pressure tight mantle having the size of 195 mm. in height, outside diameter of 130 mm., upper inside diameter of 89.9 mm., lower inside diameter of 87.2 mm., with equally tapered holes. There is a hole having a size of 6 mm. x 100 mm. for the thermo-couple at almost the point of middle-of-wall thickness. Outside surface of the molding case mantle and the lower hot plate were heated with Nichrome wire insulated with porcelain cylinder tips. The aforementioned molding case was put on the hot plate and a chrome-galvanized steel rod of 40 mm. in diameter and 220 mm. in length was placed at the center of molding case maintaining clearance of 5 mm. uniformly around this center rod. 370 g. of acrylonitrile and styrene copolymer resin with 50 mesh converted lead dioxide powder were added and pressed with a pushing rod having the dimensions of outside diameter 49.9 mm., inside diameter 40.1 mm., and the length of 200 mm. and made of hard chrome-galvanized wrought steel.

The upper hot plate of the press machine was brought down by manual adjustment to push slightly down the pushing rod upon the powder. Electric current was supplied to the heating coil. When the temperature indicated by the thermocouple reached 150° C., the upper hot plate came down further and the hydraulic pressure was applied to the lower hot plate to squeeze the powder in the molding case.

Adjusting the temperature at 155° C. as far as possible, and maintaining the pressure of hydraulic oil pump at a value of 150 kg./cm.$^2$ by gauge, and pressing was continued for 45 minutes.

The adjustment of the oil pressure manual pump was continued until the clearance between the lower edge of the upper hot plate and the upper edge of the mantle reached a constant value. When it was obtained, compression was ceased and the center rod was pushed out of the molding case, thus the B-type electrode body was made into cylindrical form.

Heating temperature in ° C. _____ 150–155
Compression pressure in kg./cm.² _____ 2430
Time of compression in minute _____ 45
Molded layer:
    Length in mm. _____ 100
    Outside diameter in mm. _____ 50
    Inside diameter in mm. _____ 40
    Appearance, black with luster.
    Electric resistance in ohm/cm. _____ 5.0±0.1

Example 9

The practical length of electrode available for industrial purposes can be produced by connecting the above mentioned short unit electrode bodies corresponding to the required length and form.

There are two methods of connecting such unit electrode either by welding at elevated temperatures or by connecting them with some appropriate organic adhesives, and these two methods are equally available for practical service.

Herein, an explanation will be offered for the preparation process of 450 mm. long electrode for oxidation electrolysis of salt solutions in an industrial electrolysis cell.

Four units of electrode bodies produced by the method stated in Example 8 having the length of approximately 100 mm. and one hemispherical bottom piece without a center core having the length of aproximately 50 mm. which will be produced by the similar process as stated in Example 8. These five pieces can be put together to get one electrode 450 mm. long. The hemispherical bottom piece has a radius of 25 mm. to give a favourable current distribution at the edge of electrode. The hollow cylindrical units of 100 mm. are welded together at first to give a 200 mm. long cylinder. The bottom piece is connected to one of these cylinders by using organic adhesive.

A detailed explanation of the welding process of two cylinders is made as follows:

A wrought steel molding case galvanized with hard chrome inside and having the dimensions of 250 mm. in height inside diameter 50 mm., upper outside diameter 90 mm., lower outside diameter 87 mm, is put into a steel mantle having the dimensions of 245 mm. in height, outside diameter 130 mm., upper inside diameter 89.9 mm., lower inside diameter 87.2 mm. with a uniform taper. At the middle of the wall thickness of this mantle, a hole having the size of 6 mm. x 120 mm. deep is prepared to insert a thermo-couple. At the outside of this mantle surface and the lower hot plate will be heated by Nichrome wire insulated with porcelain cylinder tips. The molding case with the outside mantle is placed upon the lower hot plate and one unit electrode body (cylindrical) 100 mm. long and a steel rod galvanized with hard chrome having the dimensions of 39.9 mm. in diameter and 250 mm. long is placed at the center hole of the cylindrical electrode. At the upper fringe of unit the electrode in the molding case, 3% acrylonitrile styrene copolymer converted lead dioxide powder (100 mesh) is coated in a thin film and the second unit cylinder is put down through the center rod. The upper edge of the unit cylinder is pressed by a pushing rod having the dimensions of 49.9 mm. in outside diameter, inside diameter of 40 mm., 70 mm. in length, and galvanized with hard chrome. The pressing process is the same in Example 8 and the pressure is released when the clearance between the upper edge of the mantle and lower surface of upper hot plate become constant. The center rod is taken out of the cylinder without difficulty after releasing the pressure.

Experimental data is as follows:

Heating temperature ° C. _____ 145–150
Compression pressure in kg./cm.² _____ 1850
Time of compression in minute _____ 30

Two connected units of electrodes having a length of 200 mm. and a spherical bottom piece are put together by epoxy resin with the stiffening materials such as methaphenylene diamine or phthalic acid anhydride. The following example shows a process using methaphenylene diamine as the stiffener.

20 g. of epoxy resin is put into a casserole and is warmed to 60° C. and 3 g. of methaphenylene diamine are added with stirring for 30 minutes to make a very viscous liquid. After standing to cool down to the room temperature, this paste is used to connect the units mentioned above. This paste is put on the connecting surfaces of the cylindrical unit and the hemispherical piece and these long electrode are held with a suitable fastener to give adequate pressure to the connecting surfaces.

Then, it is put into an electric dryer for two hours at 140° C. with fastener. Thus an industrial electrode body having the length of 450 mm. with a hollow cylindrical inside is otbained.

Example 10

A long electrode body prepared by Example 9 can be galvanized inside its surface with silver and copper by the following process. The electrolyte for the galvanization of silver is a mixture of the following A and B solutions.

(A) 15 g. of silver-nitrate are dissolved in 500 cc. distilled water and added thereto 10% ammonia solution slowly with stirring, until the pH (hydrogen ion concentration) arrives at 10 at 17° C. This solution is once filtered and diluted with distilled water into 1,500 cc., then (B) 1 g. of silver-nitrate is dissolved in 50 cc. distilled water and is diluted with hot boiling water into 500 cc. 0.83 g. of Rochelle salt is added to it and boiled for 20 minutes and filtered.

Before the galvanization process, the inside surface of the electrode body is washed with a 5% caustic soda solution and rinsed with enough water to keep clean the wall and poured into it 460 cc. of A solution and 90 cc. of B solution in order.

2.5 amperes of direct current is applied to the electrode body as a cathode and a silver rod 5 mm. in diameter, hanging at the center of solution, as an anode. After depositing for 1.5 hours, the electrolysis ceases and replacing the electrolyte solution by a new one, the electrolysis is continued to deposit silver on the inside surface of the electrode body. This electrolysis is continued until the solution is replaced three times. Then, the electrode is rinsed with sufficient water. Next it undergoes a galvanization of copper layer upon silver.

200 g./liter of copper sulfate solution with 50 g./liter of sulfuric acid solution are filled into the electrode body nearly 550 cc. by volume.

3 amperes of direct current are applied to the electrode body as cathode and with 10 mm. copper rod hanging at the center of solution as anode. After 5 hours, the solution is replaced with new one and there continues another ten hours of galvanization. After rinsing with water, a very smooth surface of copper deposit is obtained on the inside surface of the electrode and it has enough thickness of the copper layer to give effective conductance of electric current in industrial electrolysis.

What we claim is:

1. A method of manufacturing a substantially nonporous unitary electrode by uniting together at least two preformed electrode sections each prepared by compressing a mixture consisting essentially of lead dioxide and a synthetic resin, said resin at least initially being thermoplastic, at a temperature between the softening temperature of said synthetic resin and substantially below the decomposition temperature of lead dioxide powder, which comprises interposing between said electrode sections a binder which comprises a synthetic resin, which is thermoplastic at least initially and adherable to said preformed electrode sections, and lead dioxide, to produce an assembly, heating said assembly to an elevated temperature above the softening temperature of said binder and substantially below the decomposition temperature of lead dioxide powder and applying pressure for a time sufficient to weld said bodies together.

2. The process of claim 1 wherein said assembly is heated to a temperature higher than 130° C. at a pressure of at least 800 kg./cm.²

References Cited

UNITED STATES PATENTS

| | | | |
|---|---|---|---|
| 2,824,027 | 2/1958 | Grigger et al. | 117—212 |
| 2,846,378 | 8/1958 | Hoffman | 204—290 X |
| 3,060,115 | 10/1962 | Haupin et al. | 204—290 |
| 3,072,558 | 1/1963 | Myers et al. | 204—290 X |
| 290,941 | 12/1883 | Starr | 136—21 |
| 2,677,713 | 5/1954 | Weil et al. | 136—26 |
| 3,178,314 | 4/1965 | Horn et al. | 136—21 |

FOREIGN PATENTS 1,103,415   6/1959   Germany.

OTHER REFERENCES

Randolph et al., Plastics Engineering Handbook, Reinhold Publishing Co., New York (1960) p. 501.

EARL M. BERGERT, *Primary Examiner.*

W. E. HOAG, *Assistant Examiner.*

U.S. Cl. X.R.

204—290; 264—104